United States Patent
Byers et al.

(10) Patent No.: US 9,714,853 B2
(45) Date of Patent: Jul. 25, 2017

(54) MICROFLUIDIC FLOW RATE SENSOR

(71) Applicant: Alfred E. Mann Foundation for Scientific Research, Santa Clarita, CA (US)

(72) Inventors: Charles L. Byers, Canyon Country, CA (US); Chris J. Hetlinger, Canyon Country, CA (US)

(73) Assignee: Alfred E. Mann Foundation For Scientific Research, Santa Clarita, CA (US)

( * ) Notice: Subject to any disclaimer, the term of this patent is extended or adjusted under 35 U.S.C. 154(b) by 82 days.

(21) Appl. No.: 14/774,921

(22) PCT Filed: Mar. 14, 2014

(86) PCT No.: PCT/US2014/029672
§ 371 (c)(1),
(2) Date: Sep. 11, 2015

(87) PCT Pub. No.: WO2014/153216
PCT Pub. Date: Sep. 25, 2014

(65) Prior Publication Data
US 2016/0025535 A1    Jan. 28, 2016

Related U.S. Application Data

(60) Provisional application No. 61/784,845, filed on Mar. 14, 2013.

(51) Int. Cl.
*G01F 1/56* (2006.01)
*G01F 1/708* (2006.01)

(52) U.S. Cl.
CPC .............. *G01F 1/56* (2013.01); *G01F 1/7086* (2013.01); *G01F 1/7088* (2013.01)

(58) Field of Classification Search
CPC .. G01N 7/00; B05B 17/04; F24D 5/00; F16K 24/00; G01F 1/56
(Continued)

(56) References Cited

U.S. PATENT DOCUMENTS 4,559,831 A    12/1985  Prestele
6,880,414 B2 *  4/2005  Norton ............... G01N 15/1459
                                                    73/865.5
(Continued)

FOREIGN PATENT DOCUMENTS

WO    2010062997 A2    6/2010
WO    2010084268 A1    7/2010

OTHER PUBLICATIONS

Ewart, et al, "Mass Flow Rate Measurements in Gas Micro Flows", "Experiments in Fluids", Jun. 10, 2005, pp. 487-498, vol. 41.
(Continued)

*Primary Examiner* — Jewel V Thompson
(74) *Attorney, Agent, or Firm* — Alfred Mann Foundation

(57) ABSTRACT

A microfluidic flow rate sensor includes a droplet within a channel and a droplet movement detector that generates a signal based on the position and/or movement of the droplet within the channel. A processor determines the flow rate of a fluid through the channel based on the signal received from the droplet movement detector. In one example, the droplet movement detector is an optical detector, such as a combination of a lens and an image capturing device. In other examples, the droplet is electrically conductive, and at least a portion of the channel is conductive or includes electrical contacts. The position of the droplet within the channel is determined by observing the electrical characteristics of the channel.

17 Claims, 8 Drawing Sheets

(58) Field of Classification Search
USPC .............. 436/180; 239/11; 347/7; 137/487.5; 73/861.08
See application file for complete search history.

(56) References Cited

U.S. PATENT DOCUMENTS

| | | | |
|---|---|---|---|
| 8,528,589 B2* | 9/2013 | Miller | B01L 3/0241 137/487.5 |
| 9,156,010 B2* | 10/2015 | Colston, Jr. | B01F 3/0807 |
| 9,248,417 B2* | 2/2016 | Hindson | B01F 3/0807 |
| 9,260,234 B2* | 2/2016 | Ikushima | B65D 83/0005 |
| 2002/0177237 A1* | 11/2002 | Shvets | B01L 3/0265 436/180 |
| 2003/0132243 A1* | 7/2003 | Engel | H05K 13/046 222/61 |
| 2004/0134996 A1* | 7/2004 | Kazumasa | B05B 1/083 239/11 |
| 2005/0093938 A1* | 5/2005 | Yang | B41J 2/02 347/78 |
| 2005/0210962 A1 | 9/2005 | Bohm et al. | |
| 2010/0191482 A1 | 7/2010 | Hasson et al. | |
| 2011/0000560 A1 | 1/2011 | Miller et al. | |
| 2011/0242158 A1* | 10/2011 | Takata | B41J 2/175 347/7 |
| 2011/0311978 A1 | 12/2011 | Makarewicz, Jr. et al. | |
| 2013/0184675 A1* | 7/2013 | Li | A61M 5/16854 604/506 |

OTHER PUBLICATIONS

International Search Report, Application PCT/US2014/029672, Oct. 14, 2014.
European Search Report, Application EP 14767891.5, Nov. 7, 2016.

\* cited by examiner

MICROFLUIDIC FLOW RATE SENSOR

RELATED APPLICATIONS

This application is a US national stage application under 35 USC 371 of international application PCT/US2014/029672 filed on Mar. 14, 2014, which claims priority to U.S. Provisional Application Ser. No. 61/784,845, filed on Mar. 14, 2013, both of which are incorporated by reference in their entirety.

BACKGROUND

The invention relates in general to sensors and more specifically to flow rate sensors.

There are many situations in which it may be helpful to be able to detect and measure extremely small flow rates. For example, sensitive electronic products are often packaged, shipped, and stored in hermetically sealed electronic packages, where a leakage of minute amounts of oxygen and water vapor into the package will damage the circuitry. Similarly, even small volume changes in sealed chemical reaction vessels must be detected (e.g., by measuring extremely small flow rates into or out of the reaction vessels). There may be additional situations that also require the detection of extremely small flow rates and for which currently available methods are not effectual.

For example, the flow rate of a fluid can be measured by many methods, including deflection of a vane or a ball disposed in a fluid stream, rotation of a propeller, or the cooling effect of the fluid stream on a heated wire. However, these techniques are not effectual for measuring very tiny flow rates on the order of less than 1 picoliter per second.

DETAILED DESCRIPTION

Figure 1:
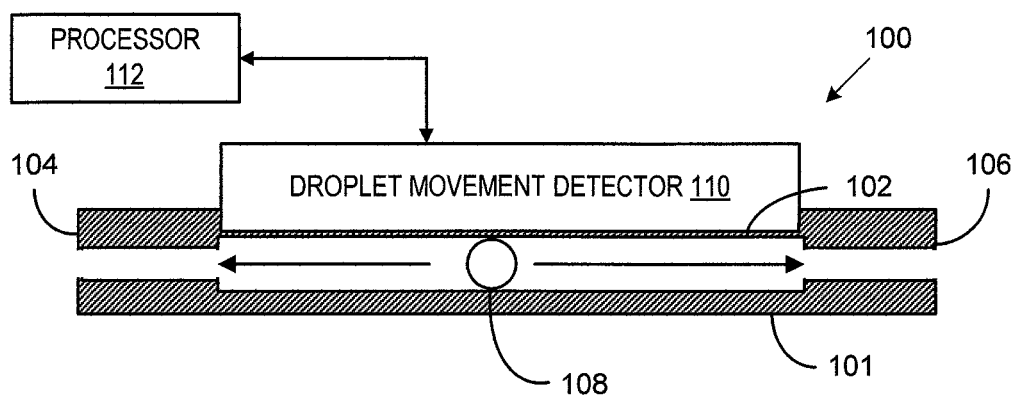
FIG. 1 is a block diagram of a cross-sectional side view of an example of a microfluidic flow rate sensor.

A microfluidic flow rate sensor in accordance with the examples discussed below includes a droplet within a channel and a droplet movement detector that generates a signal based on the position and/or movement of the droplet within the channel. A processor determines the flow rate of a fluid through the channel based on the signal. In one example, the droplet movement detector is an optical detector, such as a combination of a lens and an image capturing device.

In other examples, the droplet is electrically conductive, and at least a portion of the channel is conductive or includes electrical contacts. The position of the droplet within the channel is determined by observing the electrical characteristics between the electrical contacts or the electrical characteristics of the channel. For example, the resistance between adjacent electrical contacts distributed along the channel may be monitored, and the position of the droplet may be determined based on a low resistance that is observed between electrical contacts at the position of the droplet. In other words, the position is determined to be the position of the electrical contacts where the electrically conductive droplet forms a short circuit between the electrical contacts.

In other examples, the impedance of the channel may be observed where the impedance of the channel is dependent on the position of the droplet. Such an implementation may include observing the inductance of the channel and determining the position of the droplet based on stored data that represents a correlation between inductance and position. Alternatively, the capacitance of the channel may be observed and utilized to determine the position of the droplet based on stored data that represents a correlation between capacitance and position.

The microfluidic flow rate sensor provides several advantages over conventional systems and techniques for measuring relatively slow flow rates, as needed for evaluating hermetic electronic packages. In one method currently available for evaluating hermetic electronic packages, a flow rate through a defect is indirectly measured by enclosing a tracer gas such as helium inside the package during production and using a mass spectrometer to detect the tracer leaking out of the package in vacuum. This method, however, is prone to erroneous measurement results caused by loss of the tracer during the time elapsed between sealing and testing, by interfering non-tracer gases, by lack of equipment sensitivity, by incorrect equipment calibration, by noise in the electronic circuitry of the mass spectrometer, and by tracer gas adhering to the outside of the package.

In another conventional method, the tracer gas is forced by elevated pressure into the package through any defects present after sealing. If the tracer is radioactive, it can be detected within the package, but radioactivity can damage modern integrated circuits and, therefore, finds limited application. Alternatively, a non-radioactive tracer forced into the sealed package may be detected as it leaks back out by the methods described in the previous paragraph. This method suffers from the same potential errors plus the added uncertainty of not knowing how much tracer gas had been originally forced into the package.

There are also older, less accurate methods that involve heating the package submerged in a nonvolatile liquid until the elevated temperature increases gas pressure inside the package. If a defect is present, leaking gas is noted as bubbles.

None of the current methods can directly measure flow rate, and all but the radioactive tracer method have a lower limit of measurement of about 10 picoliters per second. The exemplary techniques and devices discussed below provide accurate and reliable measurement of flow rates significantly lower than conventional methods.

FIG. 1 is a block diagram of a cross-sectional side view of an example of a microfluidic flow rate sensor 100. The sensor 100 is comprised of a substrate 101 having a channel 102. The substrate 101 is made of silicon for the examples herein. The substrate 101, however, can be made of any suitable material, including, for example, glass, ceramic, and plastic.

The channel 102 may be formed in the substrate 101 by any fabrication technique, including, for example, photolithography. In some embodiments, the channel is defined by a void in a planar substrate that is covered by a planar lid, and the planar lid is hermetically sealed onto the substrate. An example of such a configuration can be seen in FIG. 4A.

In other embodiments, the channel can be partially defined by a void in the planar substrate and partially defined by a void in the planar lid. In still other embodiments, the channel can be partially defined by a void in a first planar substrate and partially defined by a void in a second planar substrate that is joined with the first planar substrate. In alternative embodiments, the channel can be defined entirely by a void in the planar lid. Moreover, in embodiments in which the channel is partially formed in both the substrate and the lid, the shape of the voids that define the channel can be the same in both the substrate and the planar lid (e.g., both having semi-circular cross-sectional shapes) or different (e.g., semi-circular in the lid and semi-rectangular in the substrate).

Although only one channel is shown in FIG. 1, other embodiments may include more than one channel. In these embodiments, each channel may have a different channel geometry (e.g., length, width, cross-sectional shape, etc.). Each channel geometry may represent a different resolution of the sensor.

The channel 102 of FIG. 1 is closed and relatively narrow. The channel 102 has a first end 104 and a second end 106. In operation, the sensor 100 is connected to a fluid-containing system in order to measure a pressure difference or flow rate between the first end 104 and the second end 106. Sensor 100 is adapted in one of several possible ways to connect with tubing or other fluid transport means in which flow is to be measured.

For example, if the channel 102 ends inside the edges of the substrate 101, the flow to be measured is connected by a barb mounted perpendicular to the plane of the substrate 101 and communicating with the channel 102. In embodiments where the channel 102 extends beyond the edges of the substrate 101, the ends of the channel 102 would also include a connection to the fluid-containing system, such as a barb mounted perpendicular to the plane of the substrate 101 and communicating with the channel 102. However, any suitable connection could be used.

A droplet 108 is disposed within the channel 102 between the first end 104 and the second end 106. The droplet 108 occludes the channel 102. The droplet 108 is movable within the channel 102 in accordance with a pressure difference between the first end 104 and the second end 106. For example, if the pressure at the first end 104 of the channel 102 is higher than the pressure at the second end 106 of the channel 102, then the fluid in the channel 102, along with the droplet 108, will be moved by the differential pressure force toward the second end 106 of the channel 102. Movement of the droplet 108 along the channel 102 toward the lower pressure end, therefore, can be used to determine a flow rate within the channel 102.

The droplet 108 is a different, immiscible fluid from the other fluid in the channel 102. For example, the droplet 108 may be a liquid metal, such as an alloy of gallium and indium that is liquid at room temperature, or mercury. Alternatively, the droplet 108 may be an oil or other non-volatile liquid. In other examples, the droplet 108 could be a bubble of a gas having optical or electrical properties measurably different from the fluid whose flow rate is being measured by the sensor 100. Examples of such a gas include nitrogen and argon.

The other fluid in the channel 102 is from the fluid-containing system to which the sensor 100 is connected. The other fluid may be the same on either side of the droplet 108, or there may be one type of fluid on one side of the droplet 108 and a different fluid on the other side of the droplet 108. In some cases, the other fluid is a gas. In other cases, the other fluid is a liquid.

The cross-sectional area and shape of the channel 102 is chosen based on the desired resolution of the sensor 100. For instance, the droplet 108 may be disposed within a rectangular channel that is 10 μm deep and 10 μm wide. If the droplet in such a channel moves 100 μm, then the total flow within the channel would be 10 picoliters. If the 100 μm movement of the droplet 108 required 1 second, the flow rate would be 10 picoliters per second, but if it required one hour, then the flow rate would be 2.8 femtoliters per second.

This calculation of flow rate can be modified to be used in conjunction with other cross-sectional shapes of the channel 102. For example, the cross-sectional area of the channel can be multiplied by the distance of droplet movement in order to obtain a volume. Once the volume is determined, the volume can be divided by the time elapsed while the droplet moved, which would yield a flow rate measured in units of volume per units of time.

One advantage of the sensor 100 is that there is no lower limit to the resolution of the sensor 100, assuming the flow rate is steady and there is not a limit on time. Another valuable feature is that the flow can be monitored continuously so that if the flow rate changes with time, as is often the case, the changes can be measured, as well.

The shape of the channel cross-section is important. In some embodiments, it is preferable to have a channel cross-sectional shape that is circular or at least somewhat rounded, without sharp corners such as might be found with a rectangular or square-shaped cross-section of the channel. The motivation for having a circular or at least a somewhat rounded cross-sectional shape of the channel is that surface tension in the droplet might prevent the droplet from filling the channel completely, which might allow the other gas or fluid in the channel to leak past the droplet. More specifically, if the droplet does not entirely occlude the cross-section of the channel, the sensor may not obtain accurate flow rate measurements.

Accordingly, if the intersection of the planar lid and channel wall creates a sharp corner, that sharp corner would need a filler material to form a corner-rounding filet. Alternatively, one semicircular half of the channel may be formed in the planar lid aligned with the other semicircular half of the channel formed in the substrate. Thus, when the planar lid is sealed onto the substrate, the channel will have a circular cross-sectional shape.

Total fluid flow through the sensor 100 cannot exceed the total volume of the channel 102. Thus, for some low flow rate applications, a sensor 100 can be chosen that has a channel 102 that has a relatively low total volume. For example, a channel 102 that is substantially linear would be considered to have a lower total volume when compared with other channel configurations.

For high flow rate applications, a sensor 100 can be chosen that has a larger total volume. For example, a channel 102 that has at least a portion that has a generally serpentine shape would have a larger total volume. Similarly, a channel 102 that follows a tortuous path, either zigzagging back and forth across the substrate 101 or perhaps spiraling inward from the periphery of the substrate 101 toward a central portion of the substrate 101, would also have a larger total volume.

A droplet movement detector 110 generates a signal based on the position and/or movement of the droplet 108 within the channel 102. The droplet movement detector 110 provides one or more signals to a processor 112. Based on the signal(s) received from the droplet movement detector 110, the processor 112 calculates a fluid flow rate within the channel 102.

For example, the processor 112 may monitor the change in the position of the droplet 108 over time to determine a fluid flow rate within the channel 102. More specifically, the processor 112 can be programmed with the geometry, dimensions, and volume of the channel 102. Thus, the processor can calculate a flow rate within the channel 102 based on the amount of time required for the droplet 108 to move a certain distance along the channel 102. An example of such a calculation has been set forth above.

In some embodiments, the droplet movement detector detects electrical characteristics of the channel. One example of such a configuration can be seen in FIG. 2. In other embodiments, the droplet movement detector is an optical detector that detects the position of the droplet based on light from an optical source reflected from the droplet. One example of such a configuration can be seen in FIGS. 4A and 4B. in other embodiments, the droplet movement detector is an optical detector that detects the position of the droplet based on light transmitted from an optical source through the droplet with a known optical transmittance.

Figure 2:
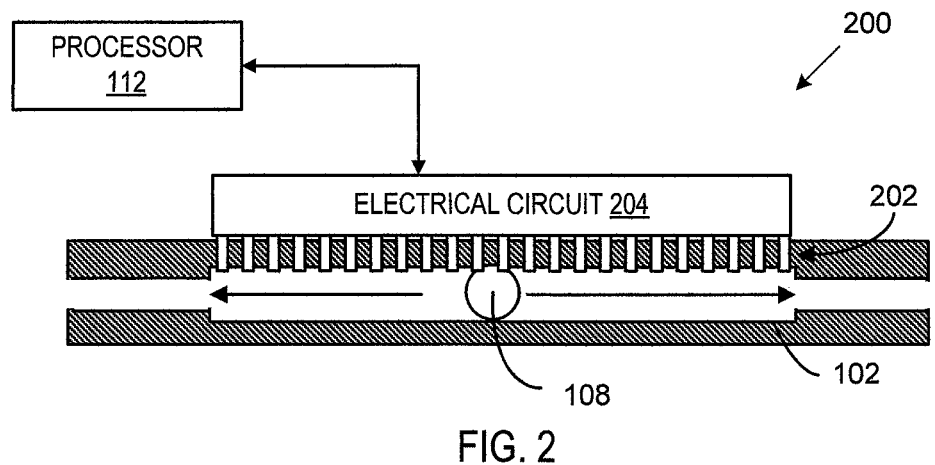
FIG. 2 is a block diagram of a cross-sectional side view of an example of a microfluidic flow rate sensor where the droplet movement detector includes an electrical circuit connected to electrical contacts disposed along the channel.

FIG. 2 is a cross-sectional side view of an example of a microfluidic flow rate sensor 200 where the droplet movement detector 110 includes at least one electrical conductor in the channel 102 and a circuit connected to the at least one electrical conductor. The circuit may include electrical circuit 204, and the at least one electrical conductor may include a row of electrical contacts 202 distributed along a length of the channel 102. Furthermore, in this embodiment, the droplet 108 is electrically conductive.

Electrical circuit 204 is configured to generate a signal based on an electrical characteristic of the electrical contacts 202. The electrical characteristic is a function of the position of the droplet 108 within the channel 102. For the example shown in FIG. 2, the electrical contacts 202 are arranged sufficiently close to each other along the channel 102 such that the droplet 108 simultaneously contacts at least two electrical contacts 202 at any given position within the channel. The electrical circuit 204 can be configured to detect current passing between at least two of the plurality of electrical contacts 202, via the droplet 108. The detection of current passing between two particular electrical contacts may take the form of detecting a lower resistance between the two electrical contacts 202 that are in contact with droplet 108.

The electrical circuit 204 may be further configured to determine the position of the droplet 108 within the channel 102 based on a position of the at least two of the plurality of electrical contacts 202 through which the current is passing. The electrical circuit 204 is configured to generate a signal that identifies the position of the particular electrical contacts 202 that are both in contact with the droplet 108.

Although not explicitly shown in FIG. 2, a current source provides current to the channel 102. In some embodiments, such as the one shown in FIG. 2, current may be provided through one or more of the electrical contacts 202 and subsequently detected by one or more other electrical contacts 202. For example, every other electrical contact 202 in the channel 102 could serve as a current source. In other embodiments, the current may be provided by a signal line such as the 2V signal line shown in the wall of the channel in FIG. 9A. Moreover, in some embodiments, the circuitry of the sensor is configured to run on direct current, while other embodiments may be configured to run on alternating current. Regardless of the manner in which current is provided to the channel, at least some of the electrical contacts 202 are configured to detect current passing through the droplet 108 from the current source.

The electrical circuit 204 is configured to detect a change in the capacitance and/or resistance and/or inductance of one or more electrical contacts 202 that are in contact with the droplet 108. The electrical circuit 204 can be further configured to determine the position of the droplet 108 within the channel 102 based on a position of the one or more electrical contacts 202 that have the detected change in capacitance and/or resistance and/or inductance. The electrical circuit 204 is also configured to generate a signal that identifies the position of the particular electrical contacts 202 that have the detected change in capacitance and/or resistance and/or inductance.

Regardless of which method is used to determine the position of the droplet 108 within the channel 102, the electrical circuit 204 provides the generated signal to the processor 112. Based on the signal received from the electrical circuit 204, the processor 112 calculates a fluid flow rate within the channel 102, as described above.

When constructing the sensor 200, area will have to be reserved on sensor 200 for the electrical circuit 204. Alternatively, MEMS (e.g., micro-electro-mechanical systems) technology can be used to lay down the electrical circuit 204, including all the channel contacts, over the entire surface, and then the substrate can be grown (e.g., deposited) over the electrical circuit 204 until thick enough to etch the channel 102 and expose the contacts. A further alternative could include two chips bonded together face to face, where the face of one chip has the micro-machined channel and the other chip has the electronic circuitry.

Figure 3:
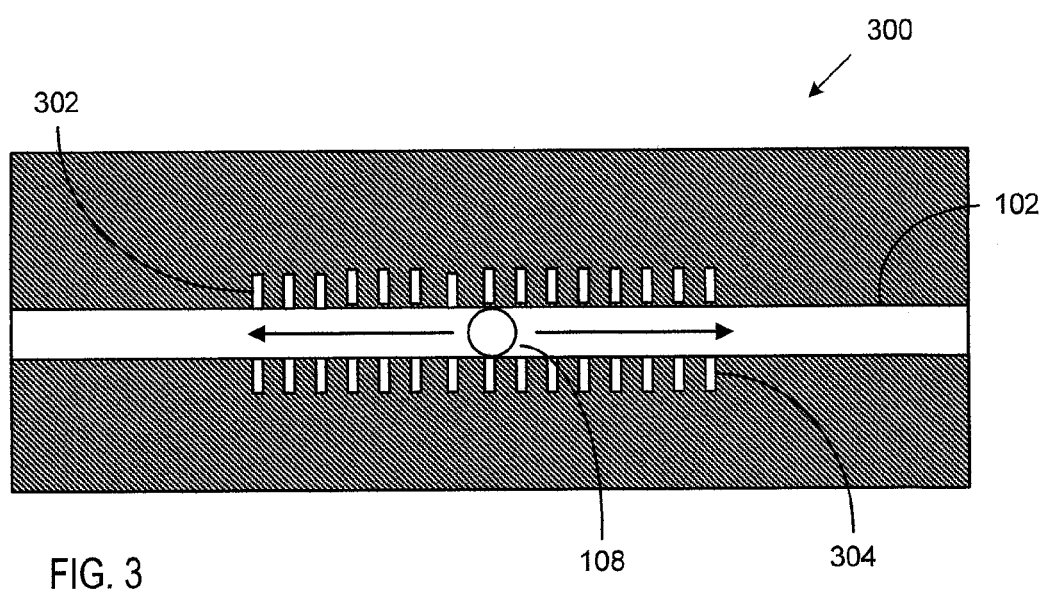
FIG. 3 is a block diagram of a cross-sectional top view of a microfluidic flow rate sensor, which has an alternative configuration of electrical contacts when compared to FIG. 2.

FIG. 3 is a cross-sectional top view of a microfluidic flow rate sensor 300, which has an alternative configuration of electrical contacts when compared to FIG. 2. For example, the sensor 300 has a plurality of electrical contacts 302 disposed on a first side of the channel 102 and a plurality of electrical contacts 304 disposed on a second side of the channel 102. Thus, the electrical contacts shown in FIG. 3 are arranged in pairs, with each pair having one electrical contact on the first side of the channel 102 and a corresponding electrical contact disposed on the second side of the channel 102.

The droplet 108 of sensor 300 is electrically conductive so that an electrical circuit 204 (not shown in FIG. 3) can detect current passing, via the droplet 108, between two of the electrical contacts that form a pair of electrical contacts, with one of the pair of electrical contacts disposed on a first side of the channel 102 and the corresponding electrical contact of the pair disposed on a second side of the channel 102.

Similar to FIG. 2, the electrical circuit 204 may be configured to determine the position of the droplet 108 within the channel 102 based on a position of the pair of electrical contacts through which the current is passing. The electrical circuit 204 is also configured to generate a signal that identifies the position of the particular pair of electrical contacts that are in contact with the droplet 108. Electrical circuit 204 then provides the generated signal to the processor 112 (not shown in FIG. 3). Based on the signal received from the electrical circuit 204, the processor 112 calculates a fluid flow rate within the channel 102, as described above.

Figure 4A:
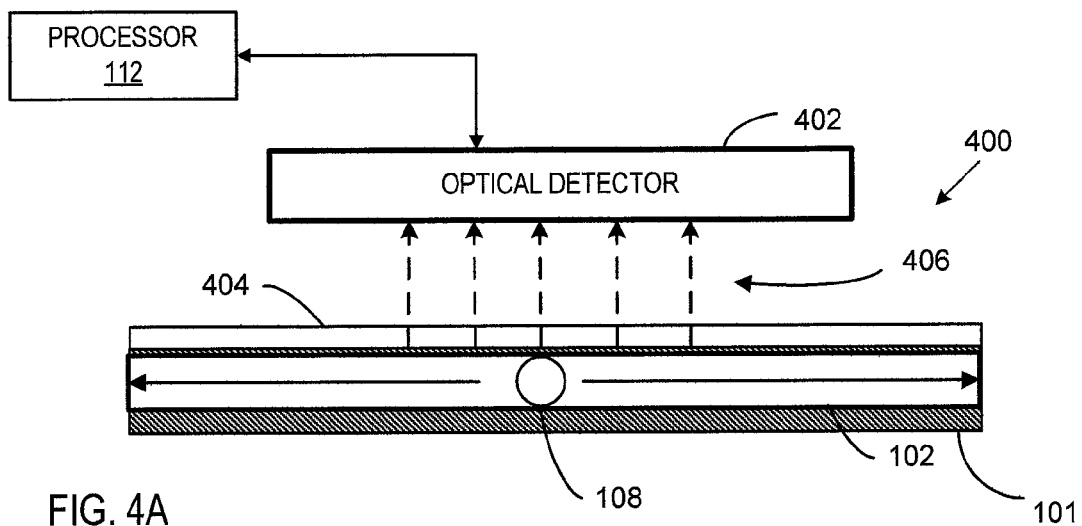
FIG. 4A is a cross-sectional side view of an example of a microfluidic flow rate sensor where the droplet movement detector includes an optical detector.

FIG. 4A is a cross-sectional side view of an example of a microfluidic flow rate sensor 400 where the droplet movement detector 110 includes an optical detector 402. In this example, a planar lid 404 is hermetically sealed onto the top of substrate 101. The planar lid 404 is transparent in this example. In other embodiments, the planar lid may be translucent. In still other embodiments, both the planar lid and the planar substrate are transparent or translucent and light passing through the flow detector from one side is blocked or refracted by the droplet and its position is thereby determined by the variation of the light falling on an optical detector on the opposite side.

Figure 4B:
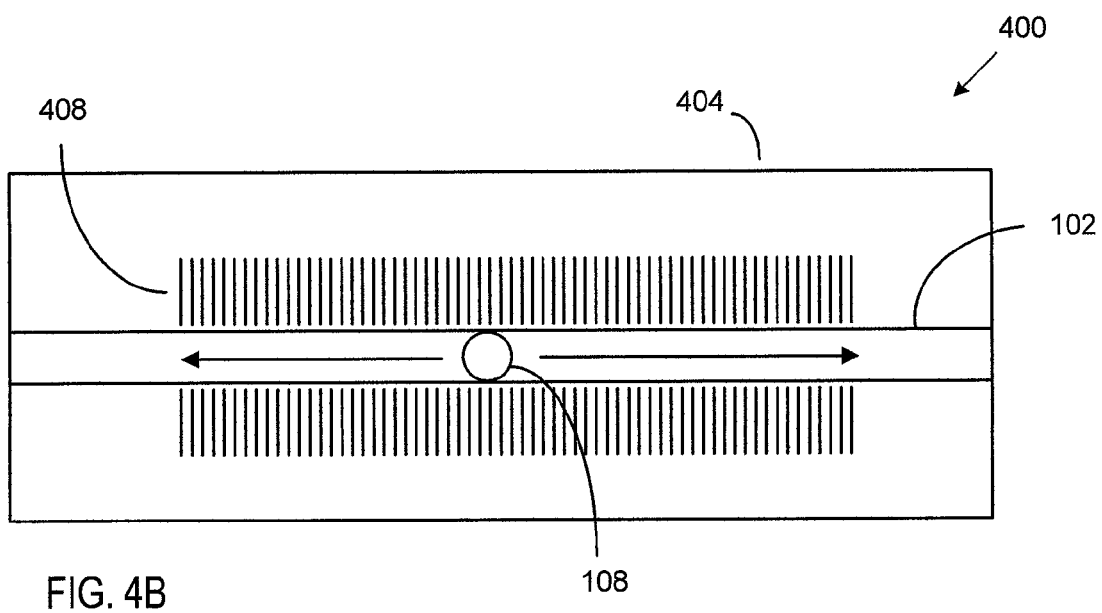
FIG. 4B is a top view of the substrate and lid shown in FIG. 4A.

In any of these cases, optical detector 402 is configured to detect the position of the droplet 108 within the channel 102, which has a width that is substantially constant along a length of the channel 102 in this embodiment. Optical detector 402 can detect the reflection of light 406 or the shadow from the droplet 108. As shown in FIG. 4B, which shows sensor 400 from above, markings 408 are disposed adjacent to the channel 102 so that the distance moved by the droplet 108 may be observed and recorded. The markings 408 shown in FIG. 4B are fine-ruled increments. However, any suitable calibrated increments in or near the channel or superimposed optically within the optical detector may be used in other embodiments.

The position and movement of the droplet 108 are detected by the optical detector 402. In alternative embodiments, the position and movement of the droplet 108 may be observed and recorded manually. The optical detector 402 generates signals representing the position and/or movement of the droplet 108 and provides the signals to the processor 112. Based on the signals received from the optical detector 402, the processor 112 calculates a fluid flow rate within the channel 102, as described above.

Figure 5:
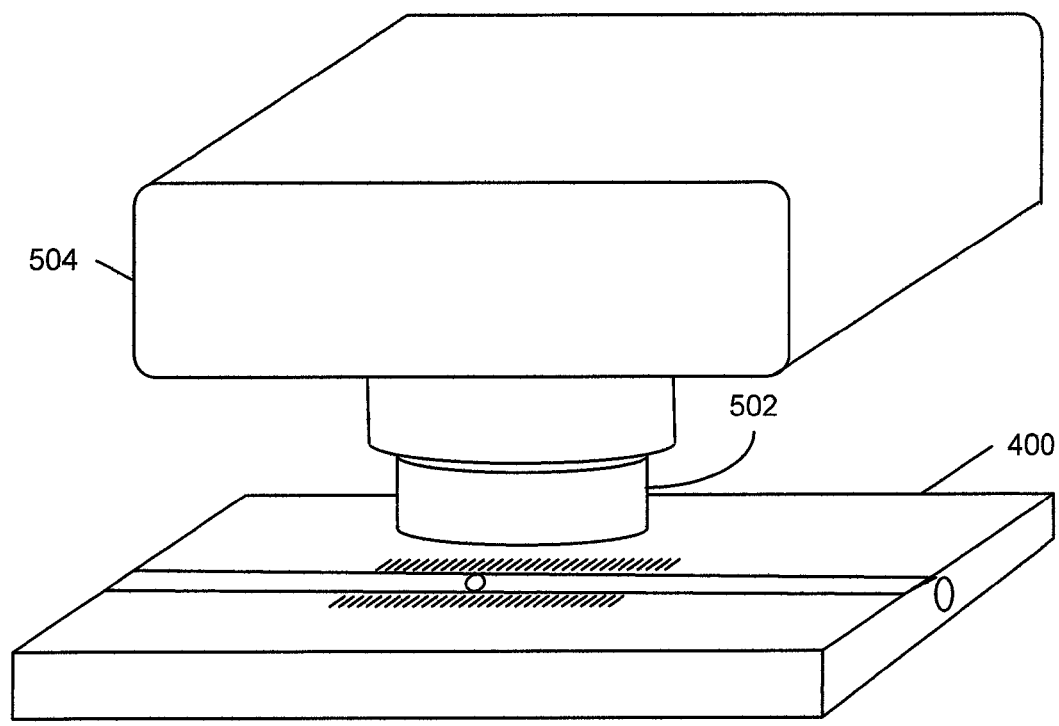
FIG. 5 is a side view of a microfluidic flow rate sensor where the droplet movement detector comprises an optical detector, which includes a lens and an image capturing device.

FIG. 5 is an example of an embodiment in which optical detector 402 includes a lens 502 and an image capturing device 504, which are configured to generate signals based on an image of the droplet 108 captured by the lens 502 and the image capturing device 504. The generated signals can represent the position and/or movement of the droplet 108 within the channel 102. The image capturing device 504 provides these signals to the processor 112 (not shown in FIG. 5). Based on the signals received from the image capturing device 504, the processor 112 calculates a fluid flow rate within the channel 102, as described above.

Figure 6:
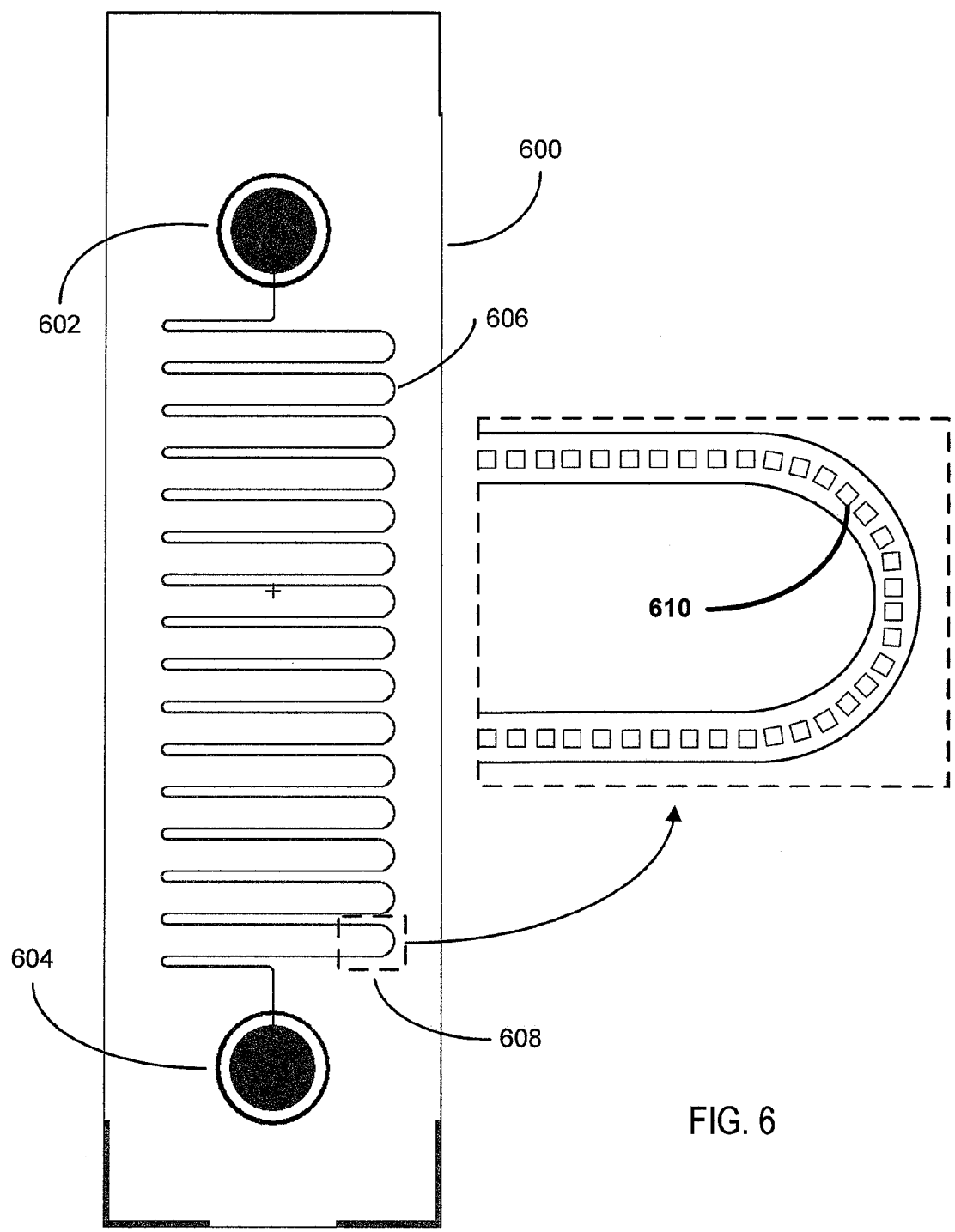
FIG. 6 is a top view of an example of a microfluidic flow rate sensor that includes ports at each end of the channel, a portion of which has a generally serpentine shape.

FIG. 6 is a top view of an example of a microfluidic flow rate sensor 600. In this embodiment, sensor 600 includes a first port 602, which provides a connection to a first end of the channel 606. Sensor 600 also includes a second port 604, which provides a connection to a second end of the channel 606. As discussed above, the channel 606 zig zags back and forth across sensor 600. By following such a tortuous path, the overall volume of the channel 606 is increased. An alternate example of a suitable path includes a spiral from the first port 602 to the second port 604 where one of the ports is at the periphery and the other port is in the center of the spiral.

A zoomed in view of a portion 608 of the channel 606 is shown in the inset of FIG. 6. The inset shows a plurality of electrical contacts 610 that are positioned within the channel 606 and connected to the electrical circuit 204 (not shown in FIG. 6). The electrical contacts 610 are disposed along the length of the channel 606 in order to monitor the position of the droplet 108, as discussed above.

In some embodiments, the electrical circuit 204 can also control valves that open and close the first port 602 and the second port 604 in order to move the droplet to any desired position within the channel or to prevent the droplet from exiting the sensor 600 during unexpectedly high flow rate conditions or if the droplet is nearing one of the first port 602 and the second port 604. Prior to performing a flow rate test, the valves (not shown) connected to ports 602 and 604 can each be connected to either a first or second pressure reservoir with respective first and second pressures. Electrical circuit 204 can control these valves in a process to position a droplet in the channel 606 to a desired starting position, whether at either end of the channel or within the channel such as in the middle, depending on the type of test to be performed by the flow rate sensor 600. If sensor 600 is to be used as a differential flow rate sensor, then the droplet can be positioned, for example, in the middle of channel 606. If sensor 600 is to measure, for example, a fluid flow from port 602 to port 604, then the droplet would be positioned in channel 606 in proximity to port 602.

Figure 7:
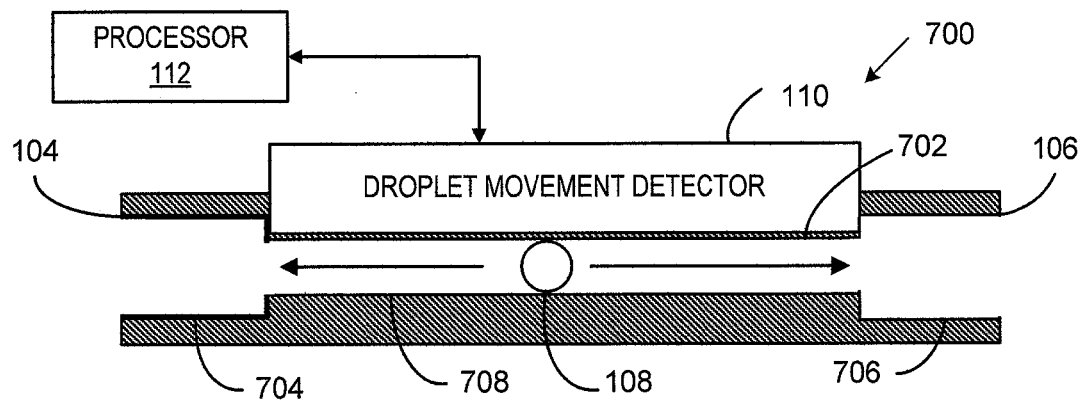
FIG. 7 is a block diagram of a cross-sectional side view of an example of a microfluidic flow rate sensor where the width of the channel varies along the length of the channel.

FIG. 7 is a cross-sectional side view of an example of a microfluidic flow rate sensor 700 where the width of the channel 702 varies along the length of the channel 702. For example, the channel 702 has a first portion 704 located near the first end 104 of the channel 702. The channel 702 has a second portion 706 located near the second end 106 of the channel 702. The channel 702 has an intermediate portion 708 located between the first portion 704 and the second portion 706.

As can be seen in FIG. 7, the width of the channel 702 is wider near the first end 104 of the channel 702 (e.g., first portion 704) and the second end 106 of the channel 702 (e.g., second portion 706) relative to the width of the channel 702 in the intermediate portion 708 of the channel 702. Although the different portions of the channel 702 are shown as discrete sections separated by sudden, sharp angles, the changes in width of the channel could, in other embodiments, be characterized by more rounded corners and/or by gradual changes (e.g., a gradient) in width over the length of the channel 702.

In embodiments in which the channel width varies, the volume and material of the droplet 108 would need to be selected to allow for the droplet 108 to sufficiently occlude the cross-sectional area and shape of the channel at the widest width of the channel 702. In instances where the cross-sectional area of the channel 702 varies, the droplet 108 may comprise material that allows the droplet 108 to expand, contract, or change shape. However, if the dimensions of the droplet 108 were permitted to change in this manner during operation of the sensor 700, the droplet movement detector 110 would need to be configured to take the changing dimensions of the droplet into account in determining the position and movement of the droplet 108 within the channel 702. Likewise, the processor 112 would need to be configured to take the changing dimensions of the droplet into account in determining the flow rate within the channel 702.

One advantage of having different channel widths across the length of the channel 702 is that the sensor 700 can have different resolutions at different portions of the channel 702. In addition, the droplet 108 will move more slowly in wider portions of the channel 702, which could aid in preventing the droplet 108 from accidentally escaping from the channel 702.

Figure 8:
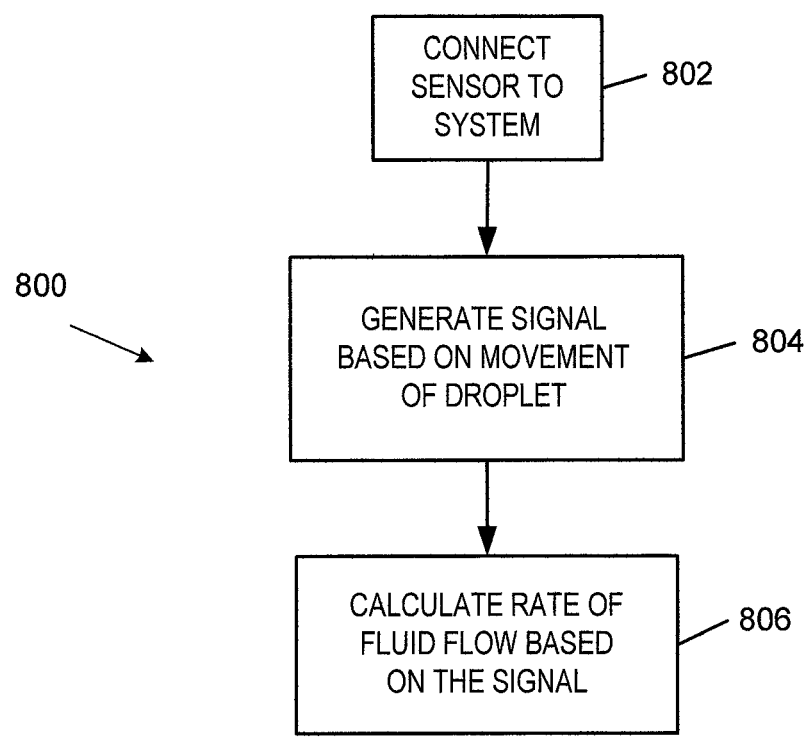
FIG. 8 is a flow chart showing an example of a method of measuring a fluid flow rate.

FIG. 8 is a flow chart showing an example of a method 800 of measuring a rate of fluid flow. The method 800 begins with step 802, in which a flow rate sensor is connected to a fluid-containing system. In this example, the flow rate sensor is a microfluidic flow rate sensor. As described above, the microfluidic flow rate sensor includes a channel having a first end and a second end and a droplet disposed within the channel between the first end and the second end. The droplet is a different fluid than the fluid contained in the fluid-containing system. The microfluidic flow rate sensor further includes a droplet movement detector and a processor coupled to the droplet movement detector.

At step 804, a signal is generated by the droplet movement detector. The signal is based on the position and/or movement of the droplet within the channel. At step 806, the processor calculates the rate of fluid flow within the channel. This calculation is based on the signal generated by the droplet movement detector.

In other embodiments of the method 800, the droplet movement detector comprises at least one electrical conductor in the channel and a circuit connected to the at least one electrical conductor, and the method 800 further includes generating, by the circuit, the signal based on an electrical characteristic of the at least one electrical conductor, wherein the electrical characteristic is a function of a position of the droplet within the channel.

In a further embodiment of the method 800, the at least one electrical conductor comprises a plurality of electrical contacts disposed along the channel, and the droplet is electrically conductive. Moreover, the method 800 also comprises detecting, by the circuit, current passing through the droplet, and determining, by the circuit, the position of the droplet within the channel based on a position of at least one of the plurality of electrical contacts that is in contact with the droplet.

In an alternative embodiment of the method 800, the at least one electrical conductor comprises a plurality of electrical contacts disposed along the channel, and the droplet is electrically conductive. The method 800 additionally comprises detecting, by the circuit, a change in at least one of capacitance, resistance, and inductance of at least one of the plurality of electrical contacts, and determining, by the circuit, the position of the droplet within the channel based on a position of the at least one of the plurality of electrical contacts that has the detected change in at least one of capacitance, resistance, and inductance.

Figure 9A:
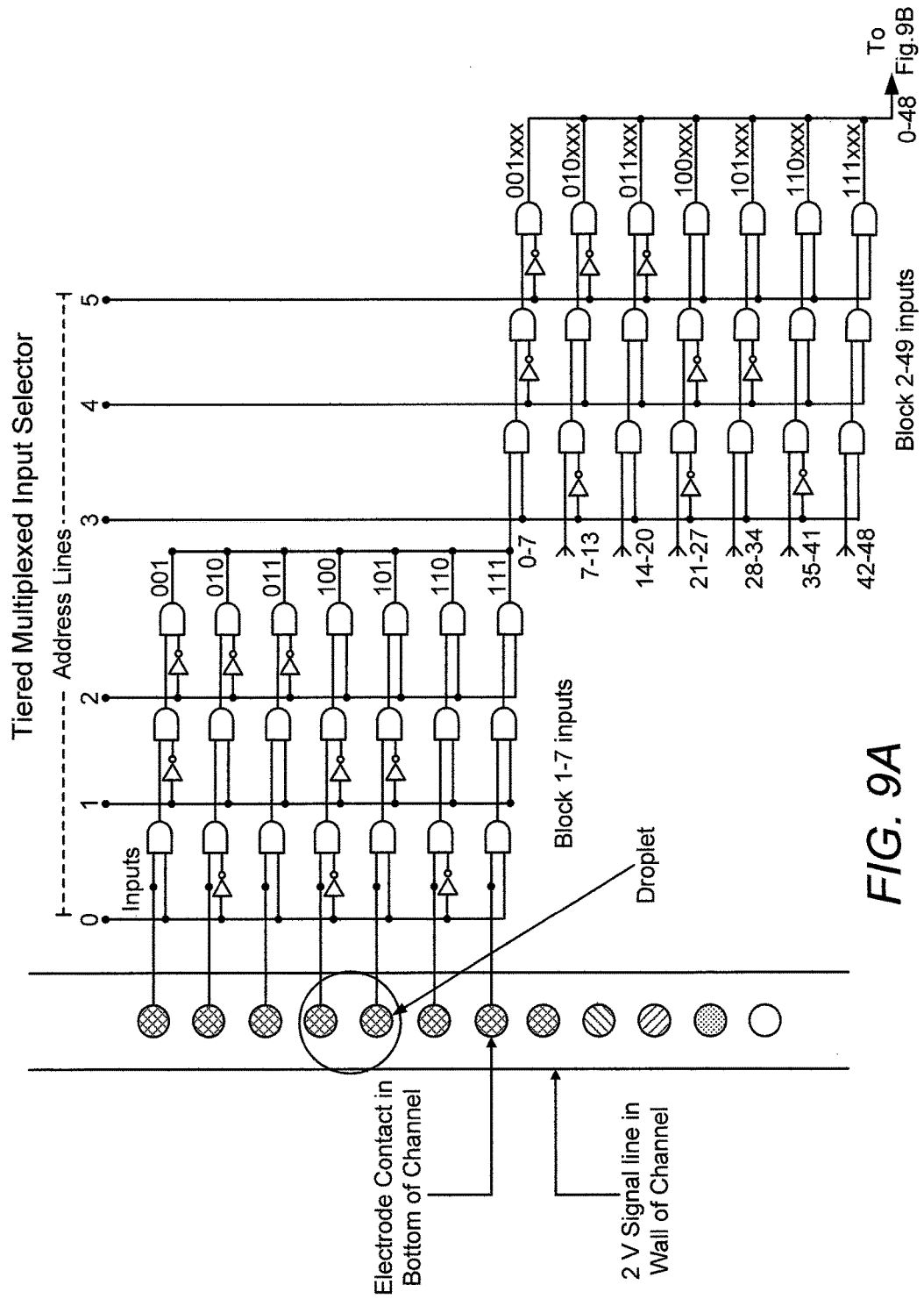
FIGS. 9A and 9B show a logic diagram of an example of how a circuit is configured to monitor the position and/or movement of a droplet within the channel of a flow rate sensor.
Figure 9B:
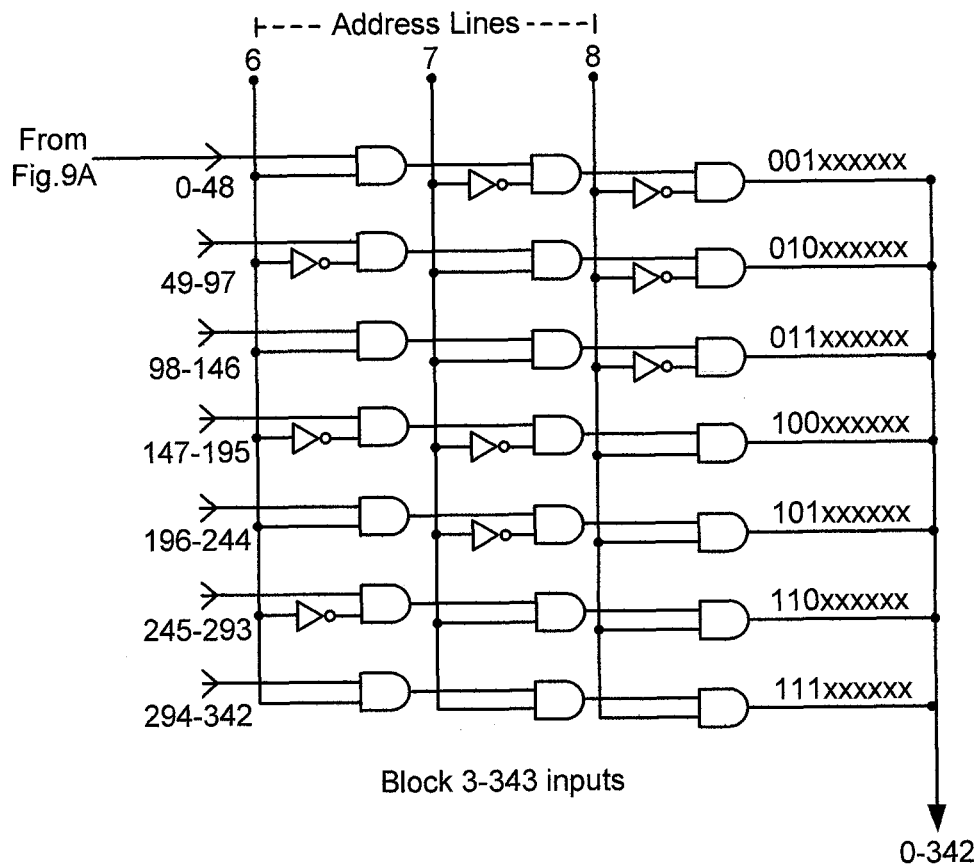

FIGS. 9A and 9B show a logic diagram of an example of how a circuit, such as electrical circuit 204, is configured to monitor the position and/or movement of a droplet within the channel of a flow rate sensor. For example, FIG. 9A shows the droplet located within the channel such that the droplet is in contact with two of the electrical contacts disposed within the channel. The droplet is also in contact with a 2V signal line in the wall of the channel. Thus, current flows from the 2V signal line, through the droplet, and into each of the electrical contacts that are in contact with the droplet. When current passes into a particular electrical contact, an input line associated with that electrical contact is driven high to generate a 9-digit address that represents the particular electrical contact.

In the example shown in FIG. 9A, the droplet is in contact with a first electrical contact represented by a logical "001001100" and with a second electrical contact represented by a logical "001001101." Based on these two addresses, the circuit can generate a signal that represents the position and/or movement of the droplet within the channel. The generated signal is transmitted to a processor so that the processor can calculate a fluid flow rate within the channel.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

The invention claimed is:

1. A microfluidic flow rate sensor comprising:
   a channel having a first end and a second end;
   a droplet disposed within the channel between the first end and the second end;
   a droplet movement detector generating a signal based on a movement of the droplet within the channel; the droplet movement detector comprising:
      at least one electrical conductor in the channel; and
      a circuit connected to the at least one electrical conductor the circuit configured to generate the signal based on an electrical characteristic of the at least one electrical conductor, wherein the electrical characteristic is a function of a position of the droplet within the channel; and
   a processor configured to calculate, based on the signal, a rate of fluid flow within the channel.

2. The microfluidic flow rate sensor of claim 1, wherein the at least one electrical conductor comprises a plurality of electrical contacts disposed along the channel and wherein the droplet is electrically conductive, the circuit configured to:
   detect current passing through the droplet, and
   determine the position of the droplet within the channel based on a position of at least one electrical contact that is in contact with the droplet.

3. The microfluidic flow rate sensor of claim 2, wherein the plurality of electrical contacts comprises a row of electrical contacts distributed along a length of the channel, the plurality of electrical contacts disposed sufficiently close to each other so that the droplet simultaneously contacts at least two of the plurality of electrical contacts.

4. The microfluidic flow rate sensor of claim 2, wherein the plurality of electrical contacts comprises at least one pair of electrical contacts where a first electrical contact of each pair is disposed on a first side of the channel and a corresponding second electrical contact of each pair is disposed on a second side of the channel.

5. The microfluidic flow rate sensor of claim 1, wherein the at least one electrical conductor comprises a plurality of electrical contacts disposed along the channel and wherein the droplet is electrically conductive, the circuit configured to:
   detect a change in at least one of capacitance, resistance, and inductance of at least one of the plurality of electrical contacts, and determine the position of the droplet within the channel based on a position of the at least one of the plurality of electrical contacts that has the detected change in at least one of capacitance, resistance, and inductance.

6. The microfluidic flow rate sensor of claim 1, wherein the channel is substantially linear.

7. The microfluidic flow rate sensor of claim 1, wherein at least a portion of the channel has a generally serpentine shape.

8. The microfluidic flow rate sensor of claim 1, wherein the channel has a channel width that is substantially constant along a length of the channel.

9. The microfluidic flow rate sensor of claim 1, wherein the channel has a channel width that varies along a length of the channel.

10. The microfluidic flow rate sensor of claim 9, wherein the channel width is wider near the first end of the channel and the second end of the channel relative to a width of the channel in an intermediate portion of the channel between the first end of the channel and the second end of the channel.

11. A method of measuring a rate of fluid flow, the method comprising:
    connecting a flow rate sensor to a fluid-containing system, wherein the flow rate sensor comprises:
        a channel having a first end and a second end,
        a droplet disposed within the channel between the first end and the second end, the droplet being a different fluid than a fluid contained in the fluid-containing system,
        a droplet movement detector, the droplet movement detector comprises at least one electrical conductor in the channel and a circuit connected to the at least one electrical conductor; and
        a processor coupled to the droplet movement detector;
    generating, by the droplet movement detector, a signal based on a movement of the droplet within the channel; wherein generating the signal is performed by the circuit, the signal based on an electrical characteristic of the at least one electrical conductor, wherein the electrical characteristic is a function of a position of the droplet within the channel; and
    calculating, by the processor, the rate of fluid flow within the channel, based on the signal generated by the droplet movement detector.

12. The method of claim 11, wherein the at least one electrical conductor comprises a plurality of electrical contacts disposed along the channel, and wherein the droplet is electrically conductive, the method further comprises:
    detecting, by the circuit, current passing through the droplet; and
    determining, by the circuit, the position of the droplet within the channel based on a position of at least one electrical contact that is in contact with the droplet.

13. The method of claim 11, wherein the at least one electrical conductor comprises a plurality of electrical contacts disposed along the channel, and wherein the droplet is electrically conductive, the method further comprises:
    detecting, by the circuit, a change in at least one of capacitance, resistance, and inductance of at least one of the plurality of electrical contacts; and
    determining, by the circuit, the position of the droplet within the channel based on a position of the at least one of the plurality of electrical contacts that has the detected change in at least one of capacitance, resistance, and inductance.

14. A microfluidic flow rate sensor comprising:
    a substrate having a channel formed therein, the channel having a first end and a second end;
    an electrically conductive droplet of fluid disposed within the channel between the first end and the second end;
    a plurality of electrical contacts disposed along the channel;
    a circuit coupled to the plurality of electrical contacts, the circuit configured to:
        detect current passing through the electrically conductive droplet,
        determine the position of the electrically conductive droplet within the channel based on a position of at least one of the electrical contacts that is in contact with the electrically conductive droplet, and
        generate a signal based on a movement of the electrically conductive droplet within the channel; and
    a processor configured to calculate, based on the signal, a rate of fluid flow within the channel.

15. The microfluidic flow rate sensor of claim 14, wherein the plurality of electrical contacts comprises a row of electrical contacts distributed along a length of the channel, the plurality of electrical contacts disposed sufficiently close to each other so that the droplet simultaneously contacts at least two of the plurality of electrical contacts.

16. The microfluidic flow rate sensor of claim 14, wherein the plurality of electrical contacts comprises at least one pair of electrical contacts where a first electrical contact of each pair is disposed on a first side of the channel and a corresponding second electrical contact of each pair is disposed on a second side of the channel.

17. A method of configuring a microfluidic flow rate sensor, the microfluidic flow rate sensor comprising:
    a channel having a first end and a second end;
    a droplet disposed within the channel between the first end and the second end,
    a droplet movement detector generating a signal based on a movement of the droplet within the channel; and
    a processor configured to calculate, based on the signal, a rate of fluid flow within the channel;
    the method comprising:
        coupling the first end of the channel to a first port of a first valve;
        coupling the second end of the channel to a first port of a second valve;
        coupling the second port of the first valve to a first pressure reservoir with a first pressure and coupling the second port of the second valve to a second pressure reservoir at a second pressure;
        or coupling the second port of the first valve to a second pressure reservoir at a second pressure and coupling the second port of the second valve to a first pressure reservoir with a first pressure;
        coupling the first and second valves to the processor, wherein the processor regulates the opening and closing of the first and second valves; and
        positioning a droplet at a desired location within the channel by regulating the opening and closing of the first and second valves.

* * * * *